United States Patent
Guneratne

[11] 3,725,847
[45] Apr. 3, 1973

[54] ELECTRICAL CONNECTORS FOR MULTIPLE THERMOCOUPLE CONDUCTORS

[75] Inventor: Piyatilleke Perera Guneratne, Millom, England

[73] Assignee: United Kingdom Atomic Energy Authority, London, England

[22] Filed: May 4, 1971

[21] Appl. No.: 140,216

[30] Foreign Application Priority Data

May 19, 1970 Great Britain.....................24,297/70

[52] U.S. Cl. ..............................................339/61 M
[51] Int. Cl. ..............................................H01r 13/12
[58] Field of Search...................339/48, 49, 59–61, 339/75, 92, 95, 103, 105, 255, 259

[56] References Cited

UNITED STATES PATENTS

| | | | |
|---|---|---|---|
| 2,892,990 | 6/1959 | Merndl | 339/60 M |
| 2,971,177 | 2/1961 | Linhart | 339/59 M |
| 2,706,803 | 4/1955 | Templeton | 339/255 R |
| 2,771,502 | 11/1956 | King et al. | 339/103 M |
| 3,512,120 | 5/1970 | Bean | 339/105 |
| 3,626,356 | 12/1971 | Trammell | 339/60 M |

FOREIGN PATENTS OR APPLICATIONS 1,000,086 1/1957 Germany.............................339/95 R Primary Examiner—Joseph H. McGlynn
Attorney—Larson, Taylor & Hinds

[57] ABSTRACT

The electrical connector for multiple mineral insulated thermocouple conductors comprises a socket member having multiple contacts which present knife edges to corresponding strip contacts in a complementary plug member. The strip contacts are embraced by a resilient sleeve which urges the strips into contact with the knife edges. The knife edges penetrate any oxide film on the strip contacts and ensure good electrical connection between the contacts. The socket member has a central resilient plug which can be compressed axially to expand it radially outwardly thereby to grip the ends of mineral insulated cables entering the socket and arranged about the central plug.

3 Claims, 4 Drawing Figures

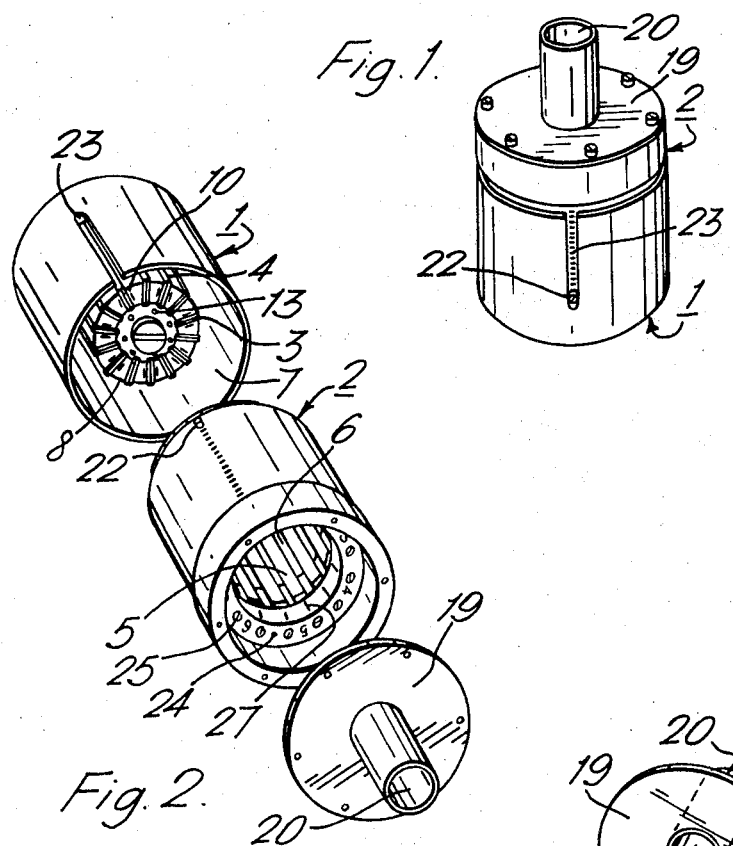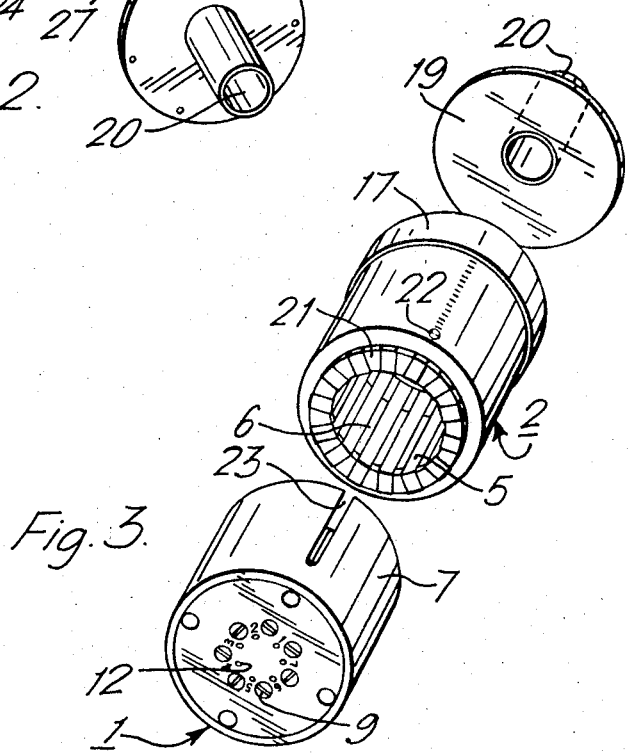

3,725,847

ELECTRICAL CONNECTORS FOR MULTIPLE THERMOCOUPLE CONDUCTORS

BACKGROUND OF INVENTION

This invention relates to electrical connectors for multiple thermocouple conductors.

There is increasing use in industry of thermocouples for temperature measurement; in particular, the nuclear reactor industry uses them in large quantities to measure the operating temperature of nuclear fuel elements, reactor coolant gases, reactor components and parameters associated with fuel manufacturing and reprocessing. Often the thermocouples are expendable because of irradiation or contamination but the instrument circuits are permanent and means are provided demountably to connect thermocouples to the instrument or control circuits. Hitherto simple plug and socket devices of the kind having multiple contacts and used for light electrical work (such as electronic equipment) have been used to provided demountable connections but these devices have several disadvantages when used for thermocouple conductors. Accuracy of the temperature readings is impaired because, firstly, the hot junction/cold junction thermocouple circuit includes the alien material of which the contacts are made and secondly, the thermocouple signal is in the micro-to-milli voltage range and has very small current so that even the smallest amount of oxidation of the contacts can cause open circuits or result in unpredictable and variable high impedences. Furthermore, the conventional form of plug and socket device for multiple conductors is adapted to receive the conductors at soldered joints or screwed connections but with thermocouple conductors the soldered joints and screwed connections deteriorate to cause an open circuit. Where the conductors are sheathed in mineral insulated cable, they are too fine (typically 0.008 inch diameter) to support the weight of the sheathing and it is necessary to extend the conductors beyond the end of the sheathing by stronger flexible conductors which are soldered or screwed to the plug and socket device. All these joints lead to unreliability and inaccuracy of the indicated temperature.

SUMMARY OF INVENTION

According to the invention, an electrical connector for multiple thermocouple conductors comprises complementary plug and socket members wherein one member has a plurality of contacts which present knife edges to corresponding planar contacts of the other member, there being resilient means for urging the contacts together. When the plug and socket members are assembled together the knife edges of the contacts of one member engage the planar contacts of the other with relatively high loading and break down any oxide film between them.

DESCRIPTION OF THE DRAWINGS

A constructional embodiment of the invention will now be described, by way of example, with reference to the accompanying drawings wherein:

FIG. 1 is a perspective view of an electrical connector for multiple thermocouple conductors, FIGS. 2 and 3 are exploded views in opposed directions.

DESCRIPTION OF THE PREFERRED EMBODIMENT

Figure 4:
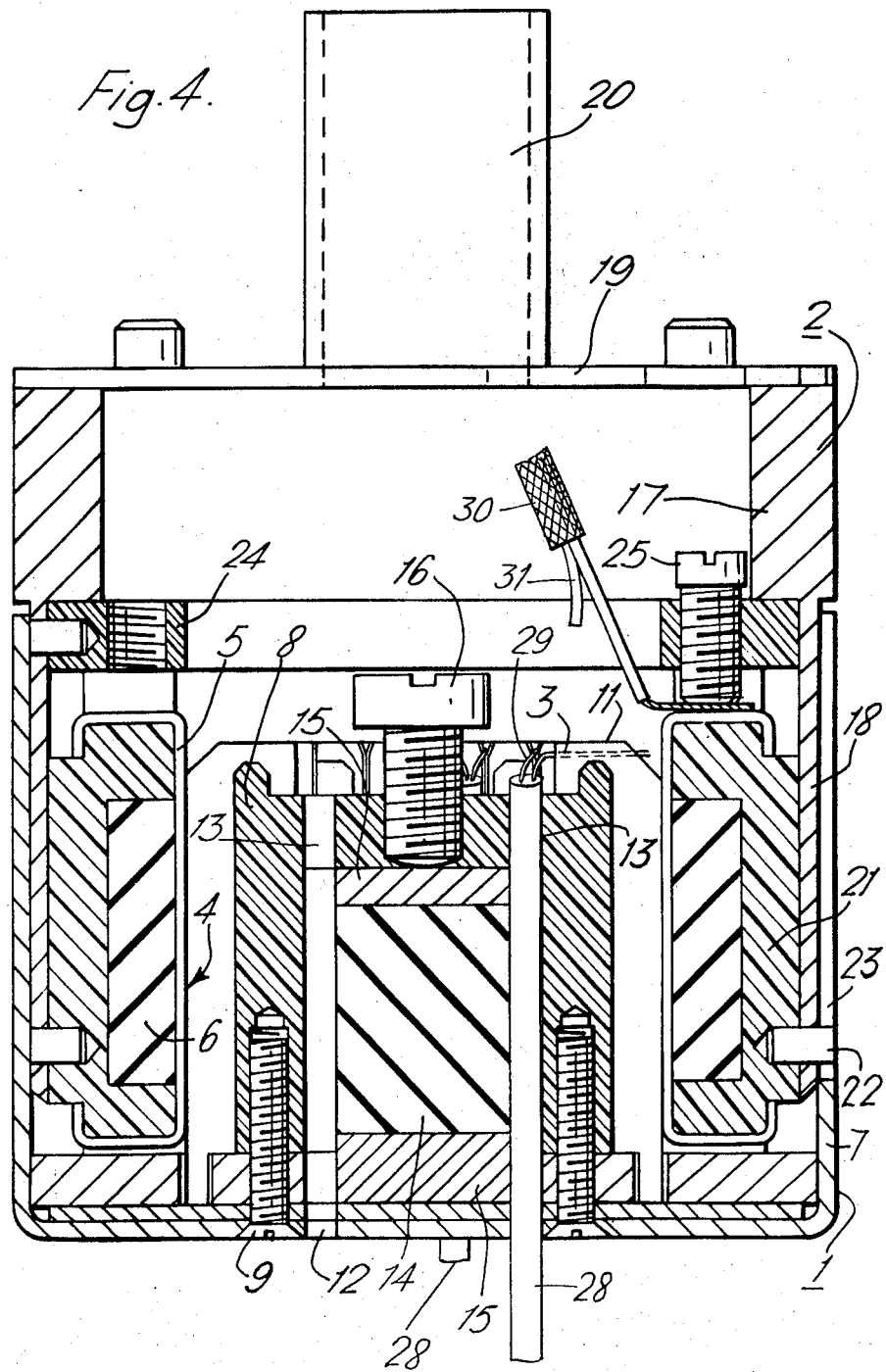
FIG. 4 is a side view in section of the assembled connector.

Referring to the drawings the connector comprises complementary plug and socket members 2, 1. Socket member 1 has fourteen contacts 3 which present knife edges 4 to fourteen corresponding planar contacts 5 of the plug member 2. A resilient sleeve 6 embraces the contacts 5 and when the device is assembled the sleeve 6 deflects the contacts 5 inwardly into contact with the knife edges 4 of the contacts 3 so that any oxide film is broken down and good electrical contact is made. Although the surface area of contact between the contacts 3, 5 is relatively small and would normally be unsuitable for electrical work, it is adequate for conducting thermocouple signals which comprise very small currents.

The socket member 1 comprises a cup shaped outer casing 7 having a hollow contact carrier 8 of insulating material (in this construction, acetal resin) which is slotted to receive the 14 equally spaced contacts 3. The contact carrier 8 is secured to the cup 7 by seven countersunk screws 9 and has polarity markings 10 for the contacts which are of Chromel and Alumel alternately spaced. The contacts 3 each comprise two fingers of sheet metal placed side-by-side and spot welded together. At the outer end portion 11 the two fingers are splayed apart to form a resilient bifurcated end which presents a clip connection for a thermocouple conductor of mineral insulated cable (not shown). The outer casing has an annular row of seven apertures 12 (numbered for thermocouple identification) and the contact carrier 8 has corresponding apertures 13 each for receiving the end of a mineral insulated cable. The contact carrier houses a central rubber member 14 interposed between two steel pressure plates 15. A screw 16 engaging a screw thread in the end of the carrier 8 bears on one of the steel pressure plates 15 and can be used to compress the rubber member axially to deform it radially outwardly into clamping engagement with cables received in the apertures 13.

The plug member 2 comprises a collar 17 having a skirt 18. The upper end of the collar is closed by a plate 19 having a tubular lead entry 20. A moulded sleeve 21 of insulating material (acetal resin) is secured to the skirt 18 and the sleeve has an annular groove which contains the resilient sleeve 6. The sleeve 21 is slotted at its ends the slots housing the ends of the 14 planar contacts 5 which are alternately of Chromel and Alumel. The plug member 2 has a pin 22 which engages a slot 23 in the outer casing 7 to ensure that the contacts 5 register with like contacts 3 on assembly. A ring 24 of acetal resin carries fourteen terminal screws 25, contact polarity markings 27, and numbering to identify the pairs of contacts. Chromel and Alumel are trade names for nickel-chromium and nickel-aluminum alloys used as thermocouple metals.

In use, mineral insulated thermocouple cables 28 are threaded through the apertures 12 and the ends of the sheaths are stripped to expose the thermocouple conductors 29. The ends of the cables are treated to seal them against entry of moisture and the member 14 is radially expanded to clamp the cables to the member 1.

The ends of the conductors are separated and pressed into their respective adjoining clips provided by the splayed ends 11 of the contact fingers 3. Flexible cables 30 (having stranded Chromel and Alumel conductors 29) extending from the temperature indicating apparatus are passed through the lead entry 20 of the plug 2 and are clamped to their respective contacts 5 by the screws 25. The end plate is screwed to the collar 17 and the plug member 2 engaged with the socket member 1.

The connector described has numerous advantages. High contact pressure is maintained which ensures low contact resistance between the knife edge and planar contacts. The connector accepts mineral insulated thermocouple cables the ends of which are clamped directly within the socket member 1 thereby avoiding intermediate joints or terminals. The ends of the fine thermocouple conductors of mineral insulated cable make good electrical contact with the contacts 3 without the need of soldered joints which frequently fail in use; also without screwed terminals which tend to break the fine conductors (typically 0.008 inch diameter) when connection is made. The contacts 3 are readily accessible when the plug member 2 is removed so that circuitry between the contacts 3 and the hot junctions of the thermocouples can be tested. The contacts can be of the same materials (in this case, Chromel and Alumel) used in the thermocouple circuitry thereby enhancing accuracy of the indicated temperature.

I claim:

1. An electrical connector for multiple thermocouple conductors, the connector comprising complementary plug and socket members wherein one said member has a plurality of spaced contacts each of which has a knife-edge which connects with a respective contact of planar contacts of the other member when the members are coupled together, the contacts being arranged in co-axial annular rows, the socket member comprising an electrically non-conductive hollow carrier bearing an annular row of knife-edge contacts, a central resilient member housed in the hollow carrier and axial compression means for deforming the central resilient member radially outwardly into clamping engagement with thermocouples received in the carrier.

2. A connector according to claim 1 wherein each of the contacts having knife-edges has a resilient bifurcated end presenting a clip connection for a conductor of a mineral insulated cable.

3. A connector according to claim 2 wherein the contacts of each annular row are alternately of nickel-chromium and nickel-aluminum alloys.

* * * * *